May 9, 1933.  C. G. KELLER  1,908,024
HUB ADAPTER
Filed Aug. 17, 1931   3 Sheets-Sheet 2
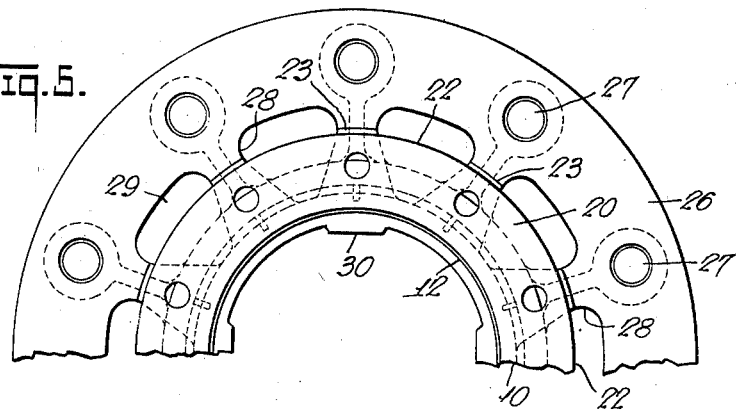
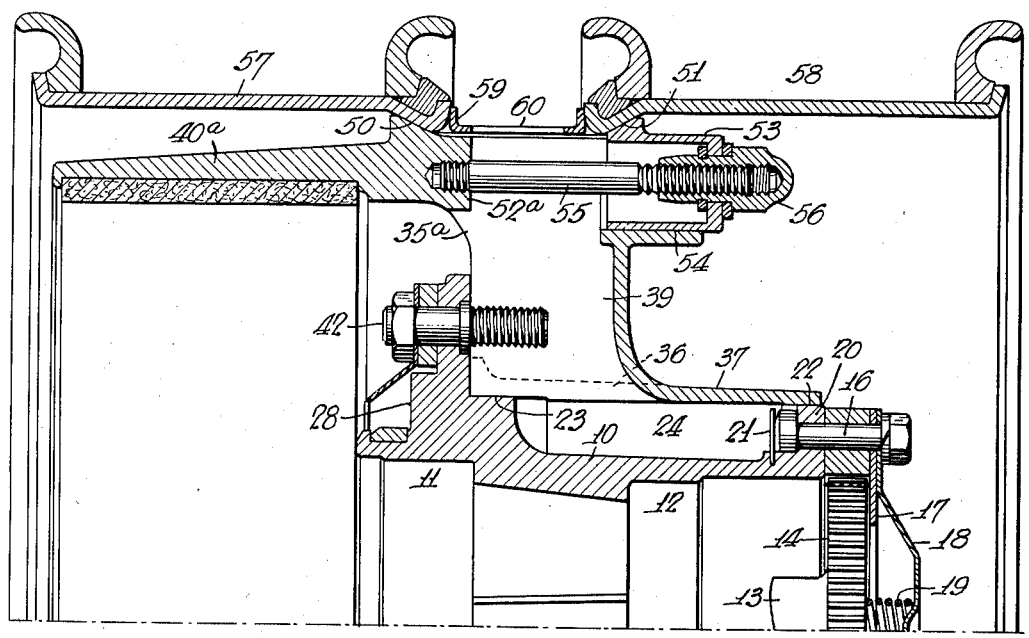
INVENTOR
Charles G. Keller
BY
ATTORNEYS

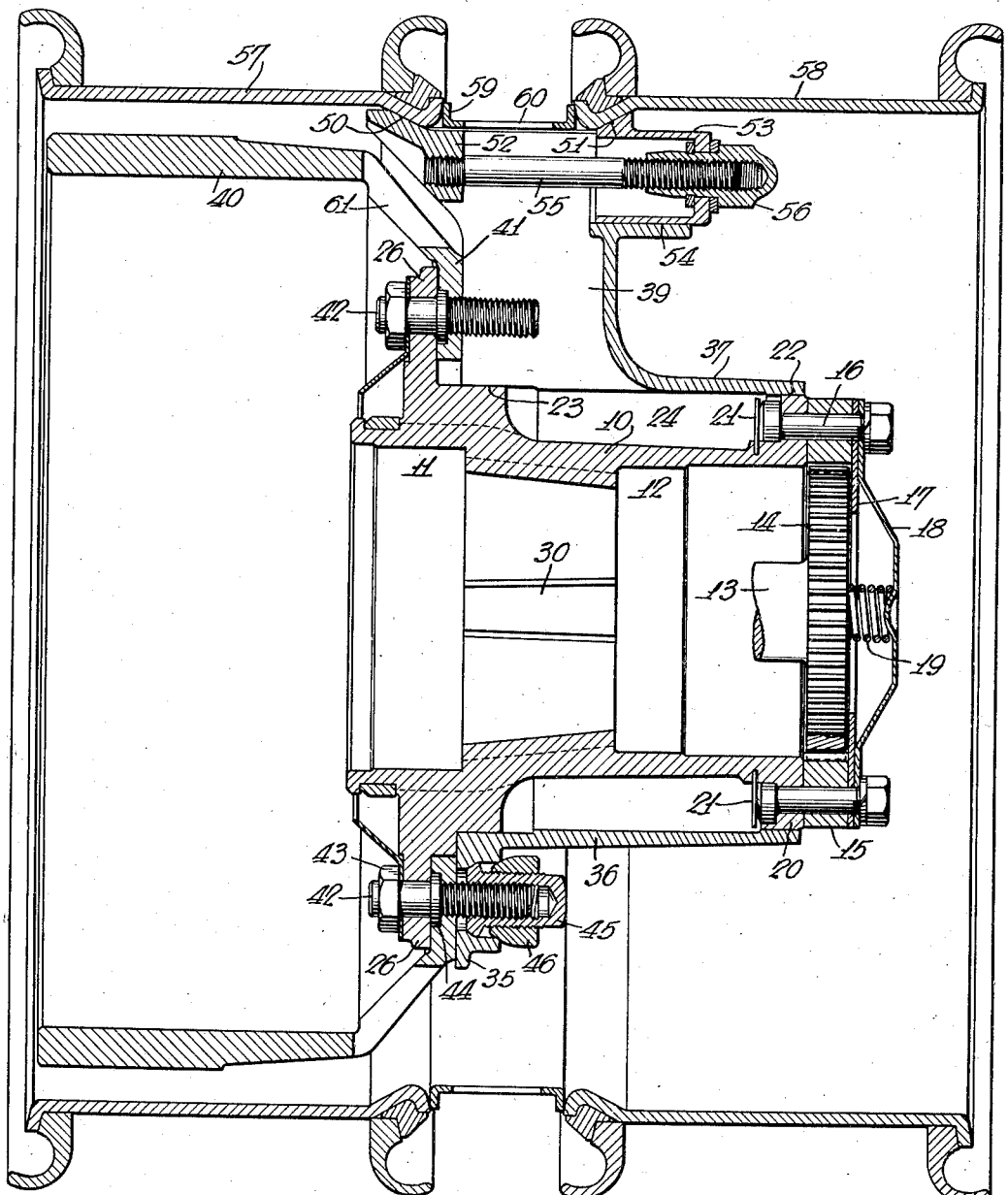

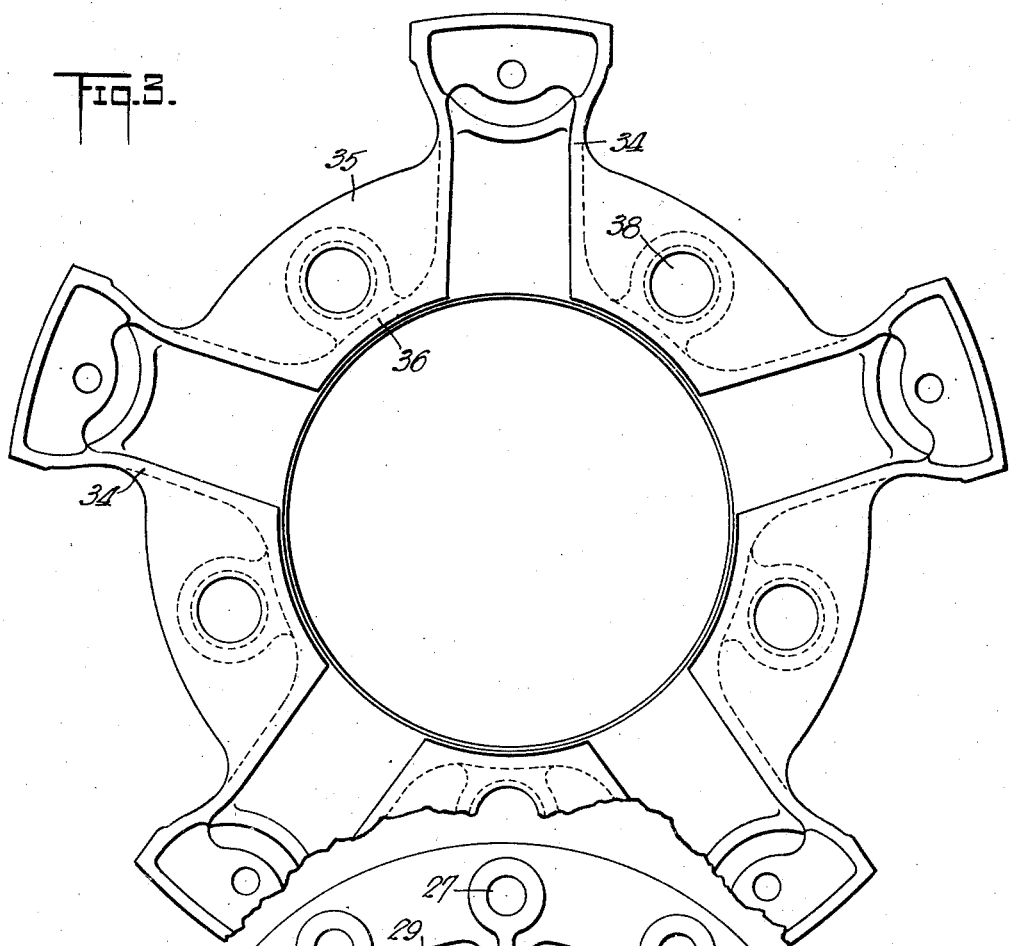
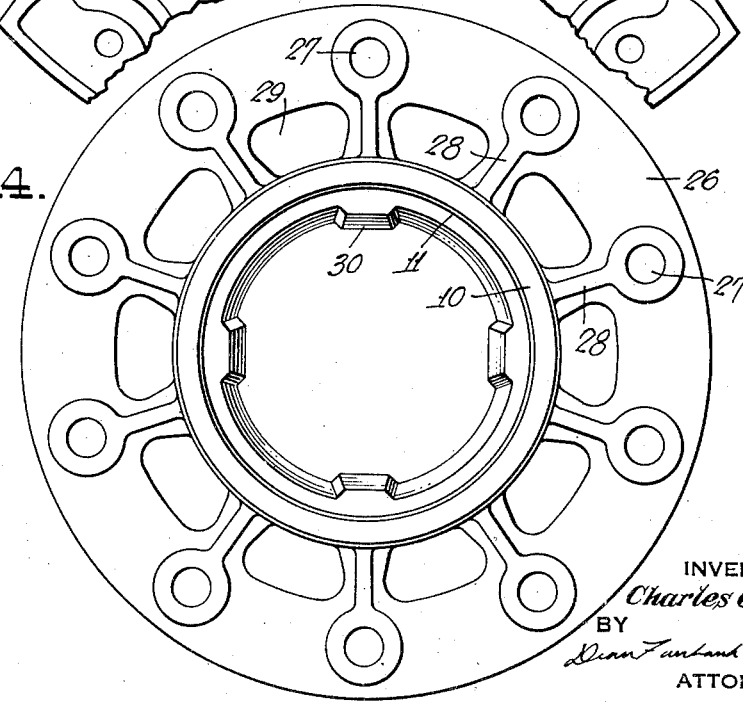

Patented May 9, 1933

1,908,024

UNITED STATES PATENT OFFICE

CHARLES G. KELLER, OF HYDE PARK, NEW YORK

HUB ADAPTER

Application filed August 17, 1931. Serial No. 557,475.

This invention is an improvement in cast metal wheels, and this application is a continuation in part of my prior application Serial No. 154,092, filed Dec. 11, 1926, now Patent No. 1,827,790, issued October 20, 1931.

I have illustrated the invention as applied to a type of construction in which the tire carrying rim is detachably secured directly to the spoke ends and the felly, commonly employed in vehicle wheels, is entirely omitted. By means of the construction illustrated, certain features of which are claimed in my copending application, the brake drum is effectively cooled and the heat resulting from brake action is prevented from being transmitted to an objectionable extent to the rims and tires. The cooling of the brake drum is effected by two sets of air currents, one passing along the inner surface of the drum and out radially through the spokes and between the two rims, and the other passing between the spokes and along the outer surface of the brake drum inside of the inner of the two tire carrying rims.

The features above referred to are not claimed specifically as parts of the present invention as they are claimed in one or more of my copending applications, but certain of these features in their cooperation with other parts are claimed herein.

In vehicle wheels of the dual tire type there is comparatively little wear on or liability of damage to the hub portion, but the rim clamping portion is subjected to severe strains and the connections of the clamping parts as well as the brake drum often become worn and require replacement.

Furthermore in manufacturing wheels for the general trade, it is necessary to make the hub part of such design, dimensions and proportions as will enable it to be properly applied to the particular vehicle for which it is designed, making it necessary to carry in stock complete wheels for various different makes of vehicles.

One of the main objects of the present invention is to provide a wheel of such construction that the body portion of the wheel and the brake drum may be readily removed from the hub, whereby the worn or broken parts may be removed and replaced by new ones on the same hub, and whereby wheels adapted for any make of vehicle may be assembled by selecting the proper hub. Thus it is only necessary to have the proper kinds of hubs for different vehicles, any one of which hubs may have the standard wheel body and brake drum attached thereto.

As a further object of my invention I provide a hub and wheel body construction whereby the wheel body is supported on the hub at spaced points adjacent to the ends of the hub, which latter is made comparatively long whereby the weight is distributed and bending or shearing strains on the spokes and attaching parts are effectively resisted with the parts of the minimum weight and thickness.

As a further important feature I provide means whereby the wheel body and the brake drum may be removed as a unit from the hub without disturbing the adjustment of the bearings. The brake drum is preferably cast integral with the spokes adjacent to the outer ends of the latter so as to connect the spoke ends, hold them rigid in respect to each other, reduce the labor and expense in assembly of the parts, and facilitate the more rapid transfer of heat from the brake drum.

As a further important advantage, the brake drum my be lined at the brake wearing surface with the body of the wheel removed, and such removal does not disturb the bearings of the hub.

In the accompanying drawings there are illustrated certain embodiments of my invention, although it will be understood that changes may be made within the scope of the appended claims and without departing from the spirit of the invention.

In these drawings:

Fig. 1 is a central longitudinal section through a wheel having a detachable brake drum, the bearings and a major portion of the driving axle being omitted.

Fig. 2 is a section similar to Fig. 1, but showing only half the wheel and showing the brake drum integral.

Fig. 3 is an end view of the inner end of the wheel body shown in Fig. 1, but without the brake drum.

Fig. 4 is an end view of the inner end of the hub member; and

Fig. 5 is an end view of approximately one-half of the outer end of the hub member.

In the construction illustrated there is provided a hub 10 of cylindrical or tubular form having internal seats 11 and 12 for a pair of spaced roller bearings, and adapted to be driven by driving connections between the axle and the hub. These connections do not form any part of my invention and may be of any desired character. As illustrated the outer end of the axle drive shaft 13 has a gear wheel 14 fitting within an internal gear 15 which is rigidly clamped to a flange 20 at the outboard end of the hub by means of bolts 16. The same bolts may hold in place a gear retaining flange 17 and a closure plate 18 and between this closure plate and the end of the axle may be a spring 19 for preventing endwise movement of the axle drive shaft. It will be understood that the bearings which engage the seats 11 and 12 support the wheel on a stationary axle housing, that the wheel is held against axial movement in respect to the housing, and that the axle 13 projects through the housing to the differential, as is common in vehicle wheel constructions.

The heads of the bolts 16 may be flattened on one side to engage the periphery of the hub to prevent rotation of the bolts, and endwise movement of the bolts prior to the tightening of the nuts on the latter may be prevented by pins 21 extending into the periphery of the hub.

The flange 20 on its periphery provides a seat 22 for the wheel body, a second seat 23 being provided adjacent to the inboard end of the hub. The seat 23 is preferably of slightly larger diameter than the seat 22 to facilitate the sliding of the wheel body into position. Between these seats there is an annular chamber 24 which communicates with the interior passages in the spokes.

The hub adjacent to its inboard end is provided with an outwardly radially extending annular flange 26 to which the wheel body may be rigidly bolted and to which the brake drum may also be bolted if the latter be detachable from the body of the wheel. This flange has a series of bolt holes 27 and may also be provided with apertures 29 so as to form spokes or connecting parts 28 between the outer part of the flange and the body of the hub as shown particularly in Fig. 2. These apertures 29 communicate with the annular chamber 24 and the seat 23 on the hub is thus interrupted and formed merely of sections on the connecting or spoke parts 28. Thus air may pass from the inboard end of the hub axially through the several passages 29 to the chamber 24 and pass outwardly from the outer ends of the hollow spokes as hereinafter pointed out. The chamber 24 serves not only as an air chamber, but also serves to materially reduce the weight of the hub.

The portion of the inner surface of the hub between the bearings may be provided with ribs 30 which are tapered lengthwise and slightly inclined axially to facilitate withdrawal of the pattern from the mold in making the casting. The ends of these flanges form abutments for the outer race rings of the bearings, and the space between the ribs 30 exposes the portions of the ends of the race rings, whereby the latter may be more readily driven out in case it is desired to remove them, as disclosed and claimed in Patent No. 1,783,432, issued Dec. 2, 1930.

The wheel body shown in Figs. 1 and 3 and which is adapted to be detachably mounted upon the hub above described, includes a plurality of spokes 34 each substantially U-shaped in cross-section, the open side of the U being toward the inboard side of the wheel. Adjacent edges of successive spokes at the inboard side are connected by web sections 35, and the adjacent sides of the successive spokes at their radially inner ends are connected by substantially cylindrical web sections 36. These web sections 36 are continued axially in an outboard direction, and the outboard side of each spoke is likewise continued axially at its radially inner end so as form a cylindrical sleeve 37.

The web sections 35 are provided with bolt holes 38 which will align with each alternate one of the bolt holes 27 of the hub whereby the body of the wheel may be rigidly bolted to the flange 26 of the hub.

The web sections 36 between the spokes are adapted to seat on the sectional seat 23 at the inboard end of the hub, while the sleeve or extension 37 of the wheel body is adapted to engage the seat 22 at the outboard end of the hub. The chamber 24 is thus closed except for the passages 29 at the inboard end of the hub, and the passages 39 which extend lengthwise within each spoke.

As illustrated the wheel body has only five spokes and thus there are five bolt holes 38 for the attachment of the wheel body of the hub, but the hub itself may have twice as many, that is ten holes 27, one-half of which would be used in securing the wheel body in place.

In Fig. 1 I have shown a brake drum 40 having an attaching flange 41 also adapted to engage the hub flange 26 so that the same bolts which hold the wheel in place on the hub will also hold the brake flange in place. I have shown bolts 42 having nuts 43 at their inboard ends for engaging the inboard surface of the hub flange 26 and collars 44 for engaging the outboard surface of the hub flange, whereby the bolts may be fixed in position on the flange. These bolts project through the flange 41 of the brake drum and also through the bolt holes 38 in the webs 35 of the wheel body. The holes 38 are preferably slightly larger than the bolts and are provided with seats within the holes so that the nuts 45 may be screwed onto the bolts to engage these seats and hold the wheel body in place. The nuts 45 are also externally threaded to receive lock nuts 46 which may also engage the webs 35 as shown particularly at the lower portion of Fig. 1. These nuts 45 and 46 come between adjacent spokes and are exposed at their outer ends so that access may be readily gained thereto from the outboard side of the wheel. The removal of the nuts 45 and 46 permits the wheel body to be slipped endwise off the hub without disturbing the latter, and also permits the brake drum to be also assembled or removed from the hub.

In case it is desired to retain the brake drum while the wheel body is removed, the collars 44 instead of being on the inboard side of the flange 41 of the brake drum may be upon the outboard side thereof so that the brake drum can only be removed by removing the nuts 43.

It will be noted that in my improved construction the wheel body is held against axial movement by the bolts 42 and is supported upon the seats 22 and 23 which are spaced to a considerable distance apart along the length of the hub. Thus the bolts are relieved of any tilting strains and the weight on the wheels is effectively supported on the hub at seats 22 and 23.

The extension or sleeve 37 serves not only as an outboard bearing or support for the wheel body, but also serves to close the air chamber 24, prevent admission of dust, mud or water thereto, and presents a smooth and attractive appearance.

The present invention does not relate particularly to the means for detachably securing rims to the outer ends of the spokes, but it does involve the mounting of a pair of rims on the spoke ends and the control of the cooling air currents, and the use of a brake drum removable without removing the hub.

The mechanism illustrated for securing the rims in place is claimed specifically in my copending applications, Serial No. 182,199, filed April 9, 1927, and Serial No. 272,404, filed April 24, 1928.

This mechanism includes a pair of rim seats 50 and 51 which are inclined radially inwardly and toward each other and are relatively movable axially. The rim seat 50 is formed on a bridge piece or cross member 52 at the outer end and open side of the spoke, while the rim seat 51 is formed on a lug 53 slidable in a curved guideway 54 in the outer end of the closed side of the spoke. The cross piece 52 carries a bolt 55 which projects loosely through the lug 53, and a nut 56 is provided for forcing the lug 53 endwise along the bolt and along its guideway to move the rim seat 51 toward the rim seat 50. Two separate rims 57 and 58 engage the two rim seats and are held in spaced relationship by a spacing ring 59. This ring has apertures 60 therein registering with the passages 39 in the several spokes.

When the wheel is in use air on the interior of the drum will be caused to flow through the passages 29 in the hub to the chamber 24 and pass out radially through the passages 39 and apertures 60 between the two rims. This flow will be caused by centrifugal or fan action. Some air from nearer the inner surface of the drum may pass through apertures 61 in the flange 41 of the drum and out through the spokes and openings 60. At the same time air between the spokes cannot pass out between the rims, but will be caused to flow axially in an inboard direction between the outer surface of the brake drum 40 and the inner surface of the rim 57.

As previously noted the wheel body has only five bolt holes 38, whereas the hub has ten bolt holes 27. Thus only one-half of the bolt holes 27 will ordinarily be used at any one time. Bolts 42 may be mounted in these holes and may project through the brake flange 41 and into the hollow spokes as shown at the upper part of Fig. 1. These projecting bolt ends do not interfere with the circulation of air through the spokes, and the bolts serve as a reserve supply in case any threads are stripped in removing or tightening the nuts 45 and 46, or onto which a disc wheel with ten holes may be mounted.

The construction shown in Fig. 2 is substantially the same as that shown in Fig. 1 except that the brake drum 40a is cast integral with the bridge piece or cross member 52a which presents the rim seat 50. As the brake drum is continuous and the spokes are spaced apart at their outer ends the web 35a between the spokes is continued as indicated in dotted lines and is spaced from the rim so that air between the spokes may pass out axially in an inboard direction between the brake drum and the inner rim 57. In this construction the brake drum is necessarily removed with the body of the wheel when the latter is taken off from the hub.

The forming of the brake drum integral facilitates the transfer of heat from the drum and reduces the cost of labor and machining because no assembly and securing together of the brake drum and wheel body is required.

As one important advantage of the invention the wheel may be readily removed from the hub in order to reline the brake drum without disturbing the adjustment of the bearings.

In Fig. 2 the brake drum is shown as provided with a separate liner 63 which may be bored or cast in place within the body of the brake drum or may be previously formed and the brake drum heated and shrunk thereon or may be detachably secured as shown in my prior application 201,990.

Having thus described my invention, what I claim as new and desire to secure by Letters Patent is:

1. A vehicle wheel including a hub presenting an annular series of peripherally spaced seat portions adjacent to the inboard end and an annular seat of smaller diameter adjacent to the outboard end, said hub having an annular chamber on the periphery thereof between said seats and communicating with the atmosphere between the sections of the seat at the inboard end, and a wheel body detachably mounted on said hub and having hollow spokes communicating at their radially inner ends with said chamber, said wheel body having a sleeve extending axially in an outboard direction and engaging the smaller of said seats.

2. A fellyless vehicle wheel including a hub, a sleeve detachably secured thereto, spokes integral with said sleeve and each having a passage lengthwise thereof open at its outer end, means for securing a pair of rims in axially spaced relationship upon the outer ends of said spokes, said hub having a passage inside of said sleeve communicating with the passages through said spokes and communicating with the atmosphere whereby air may be delivered radially between said rims.

3. A vehicle wheel including a hub having an annular flange, a pair of peripherally facing seats spaced apart axially and separated by an intermediate chamber, said flange having passages communicating with said chamber, a wheel body engaging both of said seats, said wheel body having radial passages communicating with said chamber, and means for securing said body to said flange.

4. A vehicle wheel including a hub having a pair of axially spaced peripherally facing seats adjacent to opposite ends, a wheel body having a plurality of spokes U-shaped in cross-section and connecting webs, said webs engaging with one of said seats and said wheel body having an axial extension engaging the other seat, the passages within said spokes being open at their outer ends and communicating at their inner ends with the space in the hub between said seats, and said latter space communicating with the atmosphere and means for securing a pair of rims to the outer ends of said spokes and upon opposite sides of the passages through said spokes.

5. A vehicle wheel including a hub presenting a peripherally facing seat and having an annular recess on the outer periphery thereof communicating with the atmosphere, and a wheel body detachably engaging said seat and having a plurality of hollow spokes communicating at their radially inward ends with said recess and being open to the atmosphere at their radially outer ends.

6. A vehicle wheel including a hub provided with a pair of axially spaced seats on the periphery adjacent to opposite ends thereof, and having an annular recess therebetween, said recess communicating with the atmosphere, and a wheel body engaging said seats, and having a series of hollow spokes communicating at their radially inward ends with said recess.

7. A vehicle wheel including a hub presenting a peripherally facing seat and having an annular recess on the outer periphery thereof communicating with the atmosphere, and a wheel body detachably engaging said seat and having a plurality of U-shaped spokes communicating at their radially inner ends with said recess.

8. A vehicle wheel including a hub provided with a flange adjacent to the inboard end thereof, a peripherally facing seat adjacent to said flange at the outboard side of the latter, a wheel body having a plurality of hollow spokes open at their radially inner and outer ends, radially extending webs between adjacent spokes, webs extending axially between the radially inner ends of adjacent spokes and engaging said seat, and detachable connecting members passing through the radially extending webs and said flange for detachably securing said wheel body to said flange.

9. A vehicle wheel including a hub having a peripherally facing seat, a wheel body engaging said seat and including a plurality of hollow spokes having their radially inner and outer ends communicating with the atmosphere, and means for securing said wheel body to said hub.

10. A vehicle wheel having a hub provided with a flange adjacent to the inboard end thereof, said hub being provided with an annular recess communicating with the atmosphere, a wheel body having a series of hollow spokes communicating at their radially inner ends with said recess and open to the atmosphere near the radially outer ends thereof, and means for detachably securing said wheel body to the outboard side of said flange.

11. A vehicle wheel having a hub provided with a flange adjacent to the inboard end thereof, a pair of peripherally facing seats adjacent to the opposite ends, one adjacent to said flange at the outboard side of the latter, a wheel body engaging both of said seats, and having a plurality of spokes and a radially extending web integral therewith and between the spokes, and means for securing said web to said flange.

12. A vehicle wheel including a hub formed with an annular recess on the outer periphery thereof and communicating with the atmosphere at one end thereof, and a wheel body comprising a spider made up of a series of hollow spokes communicating at their radially inner ends with said recess, said wheel body having an annular part integral therewith, and serving to close a portion of the outer periphery of said recess.

13. A vehicle wheel including a hub having a peripherally facing seat, a wheel body readily detachable from said hub and having a plurality of hollow spokes having their radially inner and outer ends communicating with the atmosphere, a radially extending web between adjacent spokes, a web extending axially between the radially inner ends of adjacent spokes and extending in an outboard direction from said spokes, and engaging said seat, and means for rigidly securing said wheel body to said hub.

Signed at Newark in the county of Essex, and State of New Jersey this 14 day of August, A. D. 1931.

CHARLES G. KELLER.